United States Patent
Collins et al.

(10) Patent No.: US 9,514,580 B2
(45) Date of Patent: Dec. 6, 2016

(54) FAULT CODE HIERARCHY SYSTEM

(71) Applicant: Cummins, Inc., Columbus, IN (US)

(72) Inventors: Steven R. Collins, Columbus, IN (US); David E. Schisler, Columbus, IN (US)

(73) Assignee: Cummins, Inc., Columbus, IN (US)

(*) Notice: Subject to any disclaimer, the term of this patent is extended or adjusted under 35 U.S.C. 154(b) by 292 days.

(21) Appl. No.: 14/219,755

(22) Filed: Mar. 19, 2014

(65) Prior Publication Data

US 2015/0269793 A1    Sep. 24, 2015

(51) Int. Cl.
*G07C 5/08* (2006.01)
*B60W 50/04* (2006.01)
*G05B 23/02* (2006.01)

(52) U.S. Cl.
CPC ............ *G07C 5/0808* (2013.01); *B60W 50/04* (2013.01); *G07C 5/085* (2013.01); *G05B 23/0275* (2013.01)

(58) Field of Classification Search
CPC   G07C 5/0808; G07C 5/0816; G07C 5/0841; G07C 5/085; G05B 23/0221; G05B 23/0275
See application file for complete search history.

(56) References Cited

U.S. PATENT DOCUMENTS

| | | | |
|---|---|---|---|
| 6,112,150 A | 8/2000 | Irons et al. | |
| 6,301,531 B1* | 10/2001 | Pierro | B61L 27/0094 701/19 |
| 7,130,768 B2 | 10/2006 | Hofmeister et al. | |
| 7,209,860 B2 | 4/2007 | Trsar et al. | |
| 7,590,476 B2* | 9/2009 | Shumate | G05B 23/0275 701/31.6 |
| 7,856,299 B2 | 12/2010 | Fink et al. | |
| 8,019,503 B2* | 9/2011 | Andreasen | G06Q 50/30 340/438 |
| 8,055,400 B2 | 11/2011 | Grenn | |
| 8,090,495 B2 | 1/2012 | Fink et al. | |
| 8,301,333 B2 | 10/2012 | Singh et al. | |
| 8,412,402 B2 | 4/2013 | Underdal et al. | |
| 2002/0138185 A1* | 9/2002 | Trsar | G07C 5/0808 701/29.1 |
| 2009/0037780 A1* | 2/2009 | Nakagaki | G06F 11/0739 714/48 |
| 2009/0216493 A1 | 8/2009 | Underdal et al. | |
| 2009/0254240 A1* | 10/2009 | Olsen, III | G06Q 10/06 701/29.5 |
| 2013/0030641 A1* | 1/2013 | Olsen, III | G05B 23/0283 701/31.6 |

\* cited by examiner

*Primary Examiner* — Thomas G Black
*Assistant Examiner* — Ce Li
(74) *Attorney, Agent, or Firm* — Foley & Lardner LLP (57) ABSTRACT

A fault code analyzer for a vehicle includes a fault code memory device configured to store a plurality of active and inactive fault codes for the vehicle and a priority processor coupled to the memory device. The priority processor is configured to: prioritize each fault code within the plurality of active and inactive fault codes; determine a first root cause fault code, the first root cause fault code corresponding to the highest prioritized fault code; determine a first set of interaction fault codes, the first set of interaction fault codes relating to the first root cause fault code; and provide the first root cause fault code and the first set of interaction fault codes to an interface device of a user.

18 Claims, 7 Drawing Sheets

| Fault Code | Subsystem | Voltage | ECM | Component/System | Failure Type | Interactions | Upstream/Downstream | Priority |
|---|---|---|---|---|---|---|---|---|
| | | 10,000 | 4,000 | 100 | 10 | 1 | 0.1 | 0.01 |
| | | 1 | 2 | 3 | 4 | 5 | 6 | 7 |
| | | Voltage = 1, or Not = 0 | ECM = 1, or Not = 0 | Component = 7, System = 3, or Effect = 0 | Sensor supply = 9; Circuitry OOR = 7; Smart = 3; Other = 1 | 1 "point" for each interaction | Engine = 1, or Aftertreatment = 0 | Fault Code / 1,000 |
| 1673 | DEF Tank | 0 | 0 | 7 | 1 | 4 | 0 | 1.673 |
| | | | | | | | Fault Code / 1,000 | 14.01673 |

FIG. 7

FAULT CODE HIERARCHY SYSTEM

TECHNICAL FIELD

The present disclosure relates to diagnostic systems for internal combustion engines. More particularly, the present application relates to a fault code hierarchy system for an internal combustion engine.

BACKGROUND

Many vehicles incorporate diagnostic systems (e.g., an On-Board Diagnostic System, "OBD"). The diagnostic system monitors the functionality of the vehicle, including the engine, and may keep a data log of the readings detected by the system. For example, the readings may include a low tire pressure, an overheated engine, and a low oil pressure. If the system detects a reading outside of the acceptable parameters (e.g., a low oil pressure), the vehicle's computer usually transmits a signal to the vehicle operator, such as a "Check Engine" light and generates a corresponding fault code.

After the "Check Engine" light has been illuminated, a technician typically must connect a diagnostic tool to the vehicle's computer in order to obtain the fault code and attempt to determine the problem that caused the fault code. Based on the fault codes received by the technician, the technician or other mechanic will examine the engine component or system that corresponds with the fault codes in an attempt to fix the malfunction and clear the engine codes.

SUMMARY

One embodiment relates to a computer-implemented method of providing a root cause fault code for a vehicle including: receiving, by a processor, a plurality of fault codes; prioritizing, by the processor, each fault code within the plurality of fault codes; determining, by the processor, a first root cause fault code corresponding to the highest prioritized fault code; determining, by the processor, a first set of interaction fault codes, the first set of interaction fault codes relating to the first root cause fault code; and providing, by the processor, the first root cause fault code and the first set of interaction fault codes to an interface device.

Another embodiment relates to a fault code analyzer for a vehicle including a fault code memory device configured to store a plurality of active and inactive fault codes for the vehicle; and a priority processor coupled to the memory device. The priority processor is configured to: prioritize each fault code within the plurality of active and inactive fault codes; determine a first root cause fault code, the first root cause fault code corresponding to the highest prioritized fault code; determine a first set of interaction fault codes, the first set of interaction fault codes relating to the first root cause fault code; and provide the first root cause and first set of interaction fault codes to an interface device of a user.

Still another embodiment relates to a fault code analyzer for a vehicle including a fault code memory device configured to store a plurality of active and inactive fault codes for the vehicle; and a priority processor coupled to the memory device. The priority processor is configured to: detect one or more malfunctions of the vehicle; generate a first set of fault codes corresponding to the one or more malfunctions of the engine; prioritize each fault code within the first set of fault codes; determine a first root cause fault code, the first root cause fault code corresponding to the highest prioritized fault code; determine a first set of interaction fault codes, the first set of interaction fault codes relating to the first root cause fault code; and provide the first root cause fault code and the first set of interaction fault codes to an interface device of a user.

These and other features, together with the organization and manner of operation thereof, will become apparent from the following detailed description when taken in conjunction with the accompanying drawings.

DETAILED DESCRIPTION OF VARIOUS EMBODIMENTS

Referring to the figures generally, the various embodiments disclosed herein relate to systems and methods of prioritizing and analyzing fault codes. When an on-board diagnostic system ("OBD") detects a fault or a condition (e.g., diesel exhaust fluid tank level empty), a fault code is generated and stored in the electronic control module ("ECM") of the vehicle. When multiple fault codes are detected, the fault code hierarchical ("FCH") analyzer categorizes what the fault code relates to (e.g., voltage, ECM, etc.) and determines a priority for each fault code. Typically, the priority ranking is based on a priority number. The higher the priority number, the more likely that fault code is the root cause of the problem. The highest priority number may be designated as the first root cause by the FCH analyzer. The FCH analyzer may list any and all interaction fault codes for the first root cause fault codes. If any fault codes remain, the FCH analyzer will designate a second root cause fault code, based on the next highest priority number for the unaccounted fault codes and provide the remaining interaction fault codes for the second root cause. As used herein, the interaction fault codes refer to fault codes that are related to (described more fully herein) the identified root cause fault code. Determining that a fault code is an interaction fault code may be based on many characteristics (e.g., each fault code is related to the same engine or vehicle component). After determination of the root cause and interaction fault codes, the service technician may address the first root cause followed by the second root cause (or, the number of root causes identified) and so on. Accordingly, a technician may readily be directed to the likely cause of the engine problem without the need of addressing each fault code individually. By addressing the root cause fault code, the interaction (related) fault codes may be cleared. Accordingly, the FCH analyzer may provide guidance for technicians, which saves time diagnosing engine problems, and reduces the repeat visitation rate. The repeat visitation rate refers to the frequency with which a vehicle is brought into a repair shop, where the repair shop identifies one or more fault codes, and the vehicle is brought back to the shop (usually within thirty-days) with one or more of the same fault codes present.

According to one embodiment, the FCH analyzer may be implemented as an application for a smartphone, tablet, or other computing device. In this embodiment, a technician or other user may record the fault codes identified by a diagnostic tool and input those codes to the application. The analyzer may generate root cause(s) information for those codes. In addition to active codes, inactive codes may be recorded and inputted as well, which increases the possibility of identifying the correct and all root causes. In comparison, typically, a diagnostic tool identifies only active codes. As such, current engine problems may not be addressed because the fault code, for whatever reason, has become inactive. This may lead to misdiagnosis of the root cause problem and lead to an increase in repeat visitation rate. By accounting for inactive fault codes, a relatively greater chance of correctly diagnosing the engine malfunction exists. According to various other embodiments, the FCH analyzer may be implemented in the ECM of the vehicle, in a diagnostic tool, and/or as a network-based application.

Figure 1:
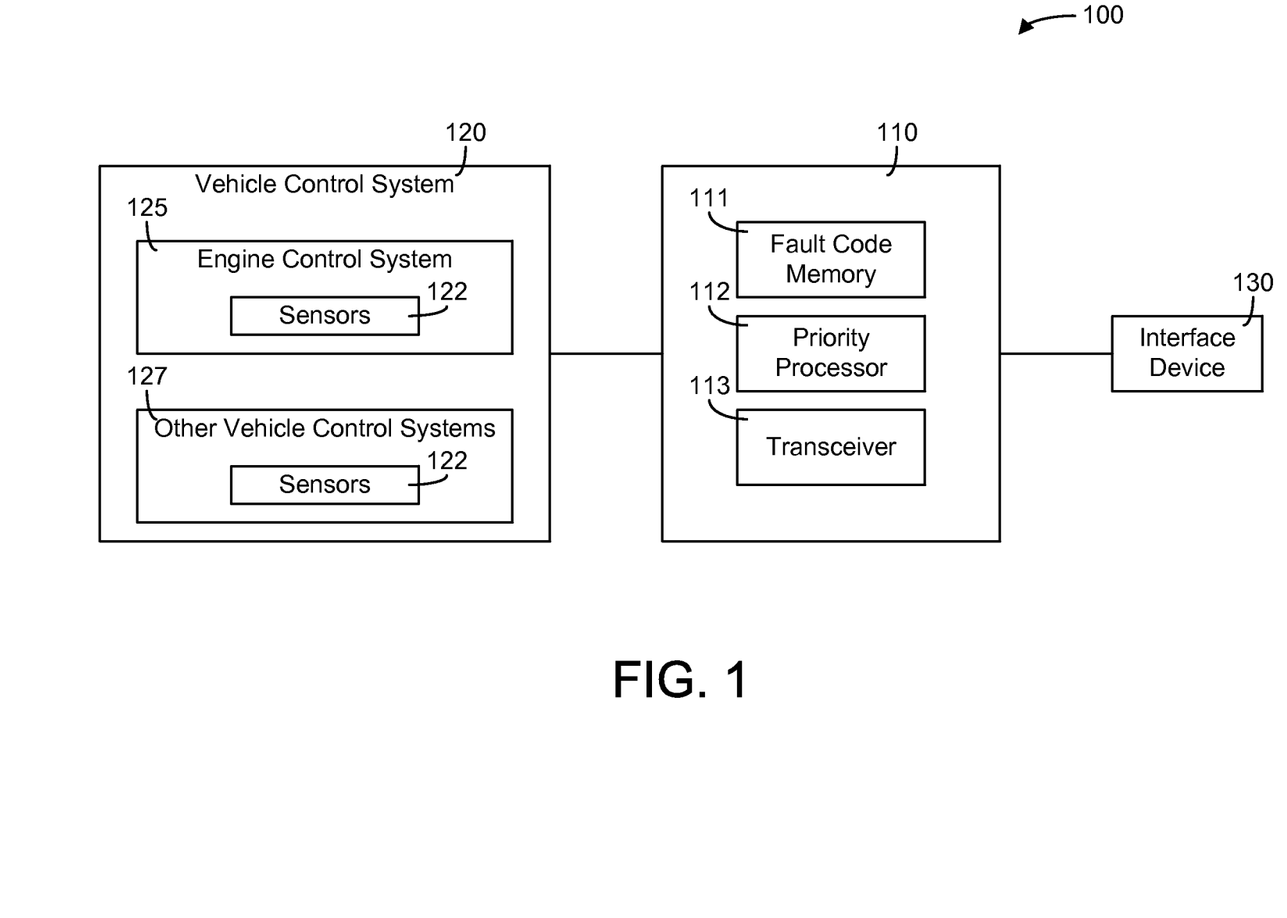
FIG. 1 is a fault code hierarchical system according to an exemplary embodiment.

Referring now to FIG. 1, a hierarchical system 100 for categorizing and prioritizing fault codes for an engine is shown according to an example embodiment. System 100 is shown to include a FCH analyzer 110 coupled to a control system 120 for a vehicle and an interface device 130. FCH analyzer 110 is shown to include a fault code memory device 111, a priority processor 112, and a transceiver 113 for communicating between and among the components of system 100. In some embodiments, the control system 120 may include an ECM system 125 and various other vehicle control systems 127 (e.g., an on-board diagnostic ("OBD") system, a powertrain control module ("PCM"), a transmission control unit, etc). The vehicle control system 120 may also include one or more sensors 122. The sensors 122 may include throttle position sensors, air-to-fuel ratio sensors, air-flow meters, etc. The sensors 122 monitor and transmit information to the vehicle control system 120. For example, a diesel exhaust fluid tank level sensor may provide information to the vehicle control system regarding the level of diesel exhaust fluid in the tank. If the level is not within a predetermined normal operating range, the control system 120 may generate a fault code to correspond with this problem. The FCH analyzer 110 may receive the fault codes and store them in the memory device 111. In some embodiments, the fault codes are stored in a memory device of the vehicle control system 120 and transmitted to the FCH analyzer 110 at a later date.

In the example of FIG. 1, the FCH analyzer 110 is shown to include a fault code memory device 111, a priority processor 112, and a transceiver 113. Processor 112 may be implemented as a general-purpose processor, an application specific integrated circuit (ASIC), one or more field programmable gate arrays (FPGAs), a digital signal processor (DSP), a group of processing components, or other suitable electronic processing components. Memory 111 may be one or more devices (e.g., RAM, ROM, Flash Memory, hard disk storage, etc.) for storing data and/or computer code for facilitating the various processes described herein. Memory 111 may be or include non-transient volatile memory or non-volatile memory. Memory 111 may include database components, object code components, script components, or any other type of information structure for supporting the various activities and information structures described herein. Memory 111 may be communicably connected to processor 112 and provide computer code or instructions to processor 112 for executing the processes described in regard to the FCH analyzer 110 herein.

Figure 2:
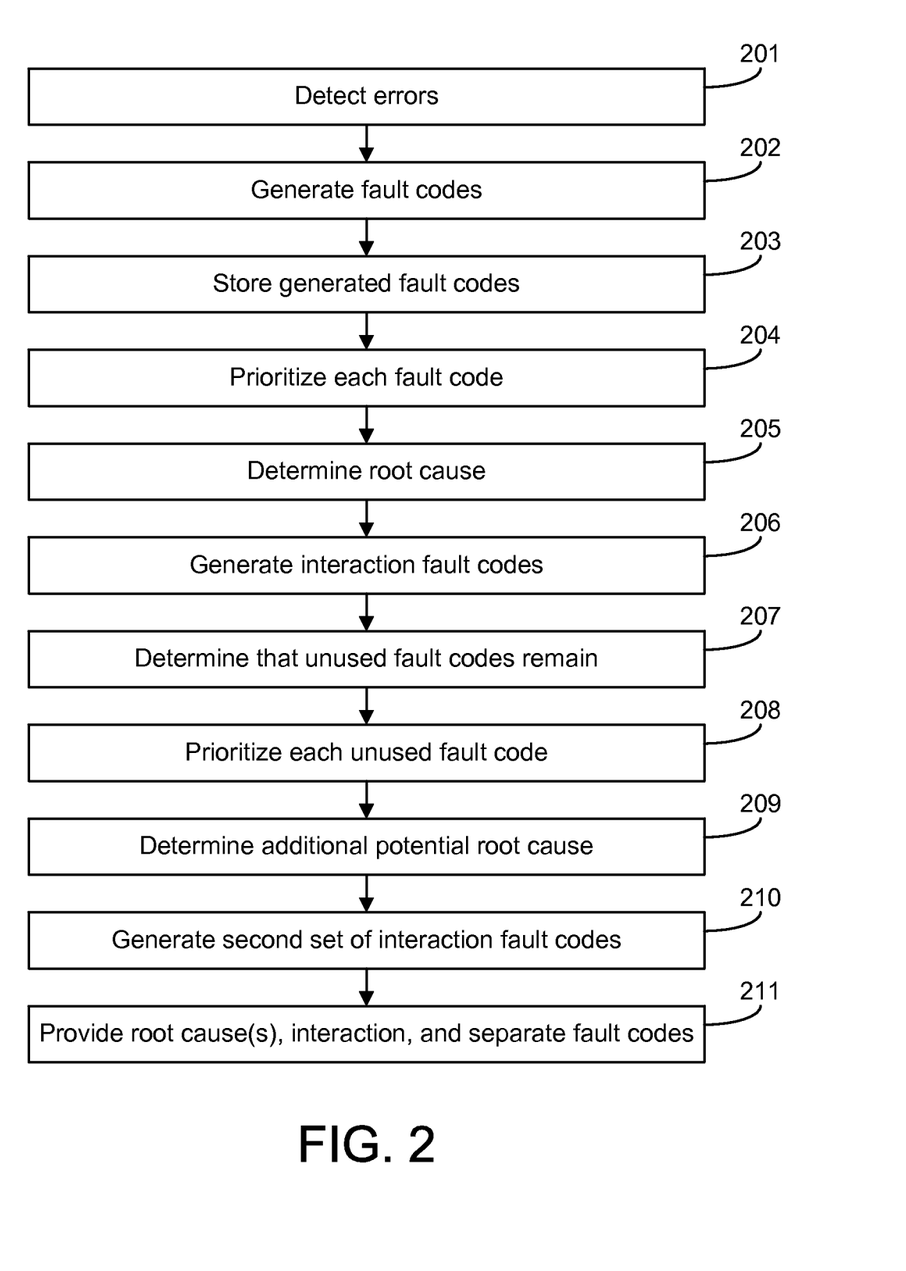
FIG. 2 is a flow diagram of a method of providing a root cause fault code according to an exemplary embodiment.
Figure 3:
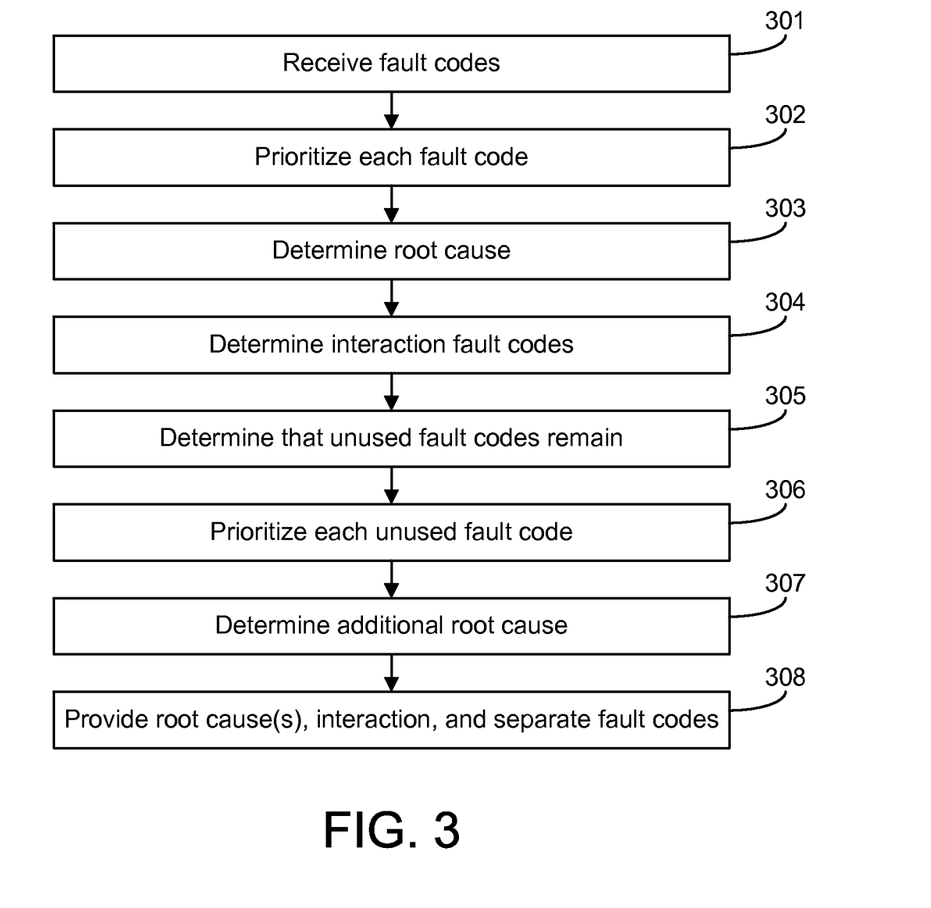
FIG. 3 is a flow diagram of another method of providing a root cause fault code according to an exemplary embodiment.

As described more fully herein in regard to FIGS. 2-3, according to one embodiment, FCH analyzer 110 receives the generated fault codes from the vehicle control system 120. The FCH analyzer 110 prioritizes each fault code (typically, the priority ranking is based on a priority number). The highest prioritized fault code (number) represents a first root cause. The FCH analyzer 110 also determines all associated interaction fault codes with the first root cause. The root cause and interaction fault code information may be provided to an interface device 130. The root cause and interaction fault code information provided to the interface device 130 enables a user to determine which fault code to address first and how to address the remaining fault codes. The interface device 130 may include a diagnostic or scan tool, a computer, a smartphone, a PDA, an input/output device for a vehicle, a stand-alone tool at a repair shop, etc.

The example in FIG. 1 shows the FCH analyzer 110 being separate and distinct from the vehicle control system 120 and the interface device 130. In some embodiments, the FCH analyzer 110 may be integrated within either one or both of the vehicle control system 120 and the interface device 130 (described later in regard to FIGS. 4A-4B). In another embodiment, the FCH analyzer 110 may be implemented in a network environment as shown in FIG. 6. In various other embodiments, the FCH analyzer 110 may be implemented as an application on the interface device 130 (FIG. 5).

Referring now also to FIG. 2, a flow chart 200 of the FCH analyzer 110 providing root cause fault code and interaction fault code information is shown according to an example embodiment. Flow chart 200 includes a number of steps but is not limited to these steps and is not necessarily performed in the order indicated. In the example in FIG. 2, the process may be initiated at 201 where one or more vehicle and/or engine conditions are detected. The vehicle and/or engine conditions may include an engine operating condition, an aftertreatment operating condition, and an electrical system operating condition. For example, an electrical system operating condition may include an ECU error; an engine operating condition may include an above normal engine temperature; and an aftertreatement operating condition may include a low diesel tank fluid level. If one or more of the engine and/or vehicle components are not operating within a predetermined range (i.e., a fault condition), typically, the engine and/or vehicle condition is detected by the vehicle control system 120 (e.g., an OBD system within control system 120) and a fault code is generated to correspond with the fault condition. In an example configuration where the FCH analyzer 110 is integrated within the control system 120, the analyzer 110 may detect the fault condition itself. Upon detection, fault codes corresponding to the detected conditions are generated by the control system 120 (202). The generated fault codes are stored in one or more memory devices of the control system 120 (203). The FCH analyzer 110 obtains the fault codes and prioritizes each fault code (204). Priority is usually based on a priority number (described below), where the highest priority number (corresponding to a single fault code) is determined by the FCH analyzer 110 to be the first root cause (205). The FCH analyzer 110 also identifies the interaction fault codes related to the first root cause (206). The FCH analyzer 110 determines that one or more previously generated fault codes (operation 203) remain used (207). For example, one or more of the fault codes have not been identified as the first root cause (205) and have not been identified as an interaction fault code (206) based on the first root cause. Accordingly, the FCH analyzer 110 prioritizes (based on priority numbers) each unused fault code (208). The highest priority fault code in that second priority determination is determined to be the second root cause fault code (209). Of the remaining fault codes (not the first or second root cause or the interaction fault codes of the first root cause), a second set of interaction fault codes are generated that correspond to the second root cause fault code (210). At this point, method 200 may revert back to process 207 to determine if there are still unaccounted for fault codes. The method 200 may continue until all of the fault codes are represented as either a root cause or an interaction fault code. Finally, the root cause, interaction, and separate fault code information may be provide to a user via an interface device 130 (211).

According to one configuration, if one or more fault codes is not classified as a root cause or an interaction fault code, the one or more fault codes may be classified as "separate" fault codes. Although not identified as a root cause or an interaction fault code, the separate fault code(s) may be provided to the user such that all potential engine conditions may be properly addressed and serviced.

According to one embodiment, the FCH analyzer prioritizes each fault code (204) based on determined priority numbers for each fault code. Generally, the priority ranking is based on how likely a particular fault code is the root cause for the other fault codes (and, consequently, the fault condition in the vehicle or engine). According to an example embodiment, the priority numbers are determined based on the fault code hierarchy categories below:
1. Voltage ($a_1$=1 or 0, $w_1$=10,000)(Yes-1, No-0)
2. ECU ($a_2$=1 or 0, $w_2$=1,000)(Yes-1, No-0)
3. Fault code type ($a_3$=7, 3, or 0, $w_3$=100)(Component-7, System-3, or Effect-0)
4. Failure type ($a_4$=9, 7, 3, or 1, $w_4$=10)(Sensor Supply-9, Circuitry Out-of-Range-7, Smart Devices-3, Other-1)
5. Number of interactions ($a_5$=No. of Interactions, $w_5$=1)
6. Location ($a_6$=1 or 0, $w_6$=0.1)(Engine-1, Aftertreatment-0)
7. Fault code number ($a_7$=(Fault Code No.)/1000, $w_7$=0.01)

The hierarchy above provides the basis for a formula, algorithm, and method of generating the priority numbers. According to one configuration, the priority number determination is as follows, where the "a" variables correspond with the category values and the "w" variables correspond with the weighting ("multiplier") for each category:

$$\text{Priority No.} = a_1*w_1 + a_2*w_2 + a_3*w_3 + a_4*w_4 + a_5*w_5 + a_6*w_6 + a_7*w_7$$

As explained more fully herein, the above category ranking is configured to provide the most likely root cause fault code(s) to a technician, such that the likely root cause fault code(s) are addressed first by the technician. According to one embodiment, the most likely root cause fault code corresponds with the highest value priority number. Thus, the weighting values shown above indicate which category most largely impacts the priority number value (e.g., fault codes that correspond with voltage related issues are more likely to be determined by the FCH analyzer to be root cause fault codes than fault codes that are unrelated to voltage conditions because of the relatively large $w_1$ value). According to various other embodiments, the weighting used (i.e., "w" values) may be adjusted to reflect, for example, various desires of the technician or user. For example, if the technician is concerned with engine-related fault codes, the technician may weight (increase the multiplier) of category 6 (location) higher in order to determine a likely root cause for engine-related fault codes. Accordingly, the seven hierarchical categories provide the basis for determining the root cause fault code in order to troubleshoot the root malfunction/condition first. As such, technicians may not need to search for the root cause malfunction and may be efficiently able to service likely root problems of the engine or vehicle, which saves time and money. The example above is only an example embodiment. Accordingly, fewer, different, and/or additional categories may be used for each priority number determination and the weighting may be different than previously described.

The priority number determination may be more fully described as follows. Each of the abovementioned categories correspond with values ("a" values as shown above), which are assigned prior to the use of the category multiplier ("w" values). The reasons for applying the various "a" values are shown in the second set of parentheses following each category name. For example, in category 1, $a_1$ is shown to be either 1 or 0. If the fault code does not correspond with a voltage issue (i.e., "No" in the second set of parentheses), the "$a_1$" value is 0. In another example, in category 3, if the fault code corresponds with a "component" condition, the "$a_3$" value is 7. The explanation of the categories and assignment of "a" values is more fully described below. Categories 5 and 7 do not have values listed after them. Categories 5 and 7 are dependent on the characteristics of the fault code number (e.g., if a fault code has 4 interactions, then $a_5*w_5$ corresponds with 4*1). The value assignments may be greater than, less than, or just not used in other embodiments depending on the application. As such, in addition to customizing the weighting system (i.e., the multiplier values) and the categories used, a user may also edit the "a" values within each category. In summary, the priority number determination is based on the weighting of categories and the values used for each category (a two-part process). As mentioned above, the weight of categories, the categories used, and the value assignments may all be customizable based on the application.

Referring to the hierarchical categories separately, category 1—voltage—refers to the generated fault codes that indicate the engine has a voltage issue. As seen above, if the fault code represents a voltage issue, $a_1$ is assigned a value of 1, otherwise $a_1$ is assigned a value of 0. As most of the sensors 122 convert the information detected into a voltage read by the vehicle control system 120 (or, in some embodiments, FCH analyzer 110) to generate the fault codes, the accuracy of the fault codes may be affected if there is a voltage malfunction. Accordingly, voltage-related fault codes are weighted heaviest ($w_1$=10,000) in the priority determination. Category 2—ECU—refers to fault codes related to the engine control unit or module. If the fault code is related to the ECU, $a_2$ is assigned a value of 1, otherwise $a_2$ is assigned a value of 0. As the ECU controls most functions of the engine, ECU-related fault codes are weighted next heaviest after voltage-related fault codes in the priority number determination ($w_2$=10,000). In category 3, the fault code is classified into one of three areas corresponding to three different $a_3$ values. The classes are: component ($a_3$=7), system ($a_3$=3), or effect ($a_3$=0). A "component" fault code refers to a specific component of a system that may be malfunctioning or not within predetermined operating ranges (e.g., an exhaust gas recirculation valve is a component of the exhaust gas recirculation system). An "effect" fault code results from another failure and is typically not the root cause of the failure. Because a component of the system may be readily identified and addressed, the component fault code is assigned a larger $a_3$ value than a system or effect $a_3$ value. Moreover, because the FCH analyzer 110 is identifying the root cause, a fault code designated as an "effect" fault code within category 3 is likely not to be a root cause and is weighted least heavily within the three designation types (i.e., $a_3=0$ for "effect" designated fault codes). After the assignment of the $a_3$ value, the category 3 multiplier is applied ($w_3=100$). Accordingly, category 3 is weighted less than categories 1 and 2.

Referring to category 4, the fault code is categorized based on the failure type it represents and is assigned a corresponding $a_4$ value. According to one embodiment, within category 4, the failure types include sensor supply ($a_4=9$), circuitry out-of-range ($a_4=7$), smart devices ($a_4=3$), and a general all other types class ($a_4=1$). As seen, if the fault code is related to a sensor malfunction ("sensor supply"), the fault code is typically weighted heavier than all other classifications within category 4. Sensor malfunctions may continue to generate fault codes and, for example, warning light indicators, such that these failure types need to be addressed first. Moreover, accuracy of the component and system readings within the engine may be called into question if there is a sensor supply issue. Circuitry out-of-range denotes fault codes that indicate a specific circuit (e.g., diesel exhaust tank fluid level sensor circuit) is generating an output that is out of range of expected values. Smart devices denotes fault codes that denote possible conditions with various smart devices. After assignment of the $a_4$ value, the multiplier ($w_4$) is applied, which is, according to one embodiment, weighted less than categories 1-3 (i.e., $w_4=10$).

The fifth category, number interactions, refers to the number of interactions for a specific fault code in relation to the other generated fault codes. The number of interactions for a specific fault code corresponds to the $a_5$ value. Generally, interaction fault codes are generated codes that may be related (i.e., interact) to a specific generated fault code. The term "specific fault code" refers to the fault code undergoing a priority number determination. The greater the number of interactions equates to a greater priority number impact (i.e., greater priority number). An interaction occurs if: a causal relationship between a generated fault code and the specific fault code exists (e.g., some fault codes trigger other fault codes or disable other fault codes); the specific fault code and a generated fault code relate to the same component or system; and/or the specific fault code and a generated fault code only differ based on a gradation of severity (e.g., if the specific fault code denotes a severe level and the other fault code denotes a moderately severe level of the same failure type). As an example of interaction fault codes based on a gradation of severity relationship, suppose the FCH analyzer 110 receives (or, in some embodiments, generates) five fault codes: 1673, 3547, 3498, 3497, and 3714. The corresponding descriptions of the fault codes are:

Fault code 1673: Aftertreatment 1 Diesel Exhaust Fluid Tank Level—Data valid but below normal operating range—Most severe level;

Fault code 3547: Aftertreatment Diesel Exhaust Fluid Tank Empty—Conditions exists;

Fault code 3498: Aftertreatment 1 Diesel Exhaust Fluid Tank Level—Data valid but below normal operating range—Moderately severe level;

Fault code 3497: Aftertreatment 1 Diesel Exhaust Fluid Tank Level—Data valid but below normal operating range—Least severe level; and Fault code 3714: Engine Protection Derate—Condition exists.

Thus, fault codes 3547, 3497, 3498, and 1673 are gradations of severity for the Diesel Exhaust Fluid tank level. Accordingly, 3547, 3497, and 3498 are "interactions" of fault code 1673 (therefore, fault code 1673 has 3 interactions: 3547, 3497, and 3498). However, from the above relationship factors, fault code 3714 has zero interactions. If this example was carried through method 200 (or method 300 below), fault code 1673 would generate the highest priority number and be identified as a root cause based on its number of interactions and it being the designated as the most severe code. Accordingly, a mechanic or technician would address fault code 1673 first. Based on the interactions, troubleshooting 1673 may resolve the malfunction root cause and clear the other interaction fault codes. In sum, the number of interactions is determined by the FCH analyzer 110 and the higher the number of interactions, the greater the effect there is on the priority number determination. However, the weighting applied to category 5 ($w_5$) is less than that of categories 1-4 ($w_5=1$), such that category 5 has less of an impact on the determined priority number than categories 1-4.

Still referring to the fault code hierarchy categories, category 6 refers to the location, which is sub-classified as engine or aftertreatment, according to one configuration. If the fault code is related to the engine, the $a_6$ value is 1, otherwise the $a_6$ value (for aftertreatment) is 0. In operation, engine fault codes are more likely to cause aftertreatment fault codes than vice versa. Accordingly, a greater emphasis is placed on engine fault codes than on after treatment fault codes. For example, aftertreatment fault codes may refer to possible malfunctions in the emissions system. According to one embodiment, the aftertreatment system treats exhaust gas from a diesel engine to reduce the presence of nitrogen oxides, other pollutants, and unwanted particles in the exhaust gas. Engine fault codes relate to the operation of the engine (i.e., pre-aftertreatment). According to alternate embodiments, category 6 may include other location categories, such as a braking system with a specific "$a_6$" value for each class within category 6.

The last and least weighted category ($w_7=0.01$) in the priority number determination is category 7, fault code number. In some embodiments, $a_7$ is determined by dividing the fault code number by one-thousand (e.g., $a_7=1.673=1673/1000$). According to one embodiment, category 7 may be utilized as a tie-breaker for priority number determinations. Since all fault codes are assigned different fault code numbers, the insertion of this category in the priority number determination will prevent a tie in priority numbers.

Figure 7:
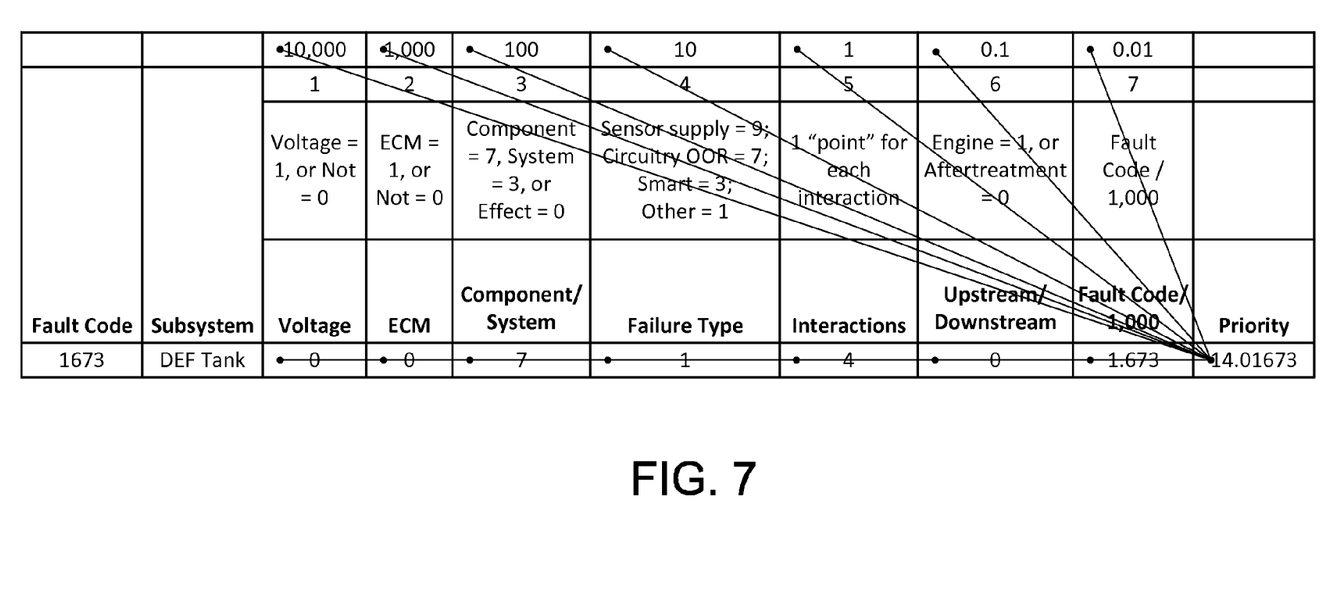
FIG. 7 is a front view of a display for an interface device for a fault code hierarchical system according to an exemplary embodiment.

With the above in mind, an example priority number determination is shown in FIG. 7 for fault code number 1673. As mentioned above, fault code 1673 corresponds with a diesel exhaust fluid tank. Accordingly, fault code 1673 is not related to a voltage issue ($a_1$ is 0); is not related to the ECM ($a_2$ is 0); is related to a specific component—the diesel exhaust fluid tank ($a_3$ is 7); is not classified into a sensor supply, circuitry out-of-range, or smart device category ($a_4$ is 1); using the above example as mentioned above, has 4 interactions ($a_5$ is 4); is not related to the engine ($a_6$ is 0); and has an $a_7$ value of 1.673 (i.e., 1673/1000). Thus, using the above example, the priority number for fault code 1673 is determined as follows:

$$714.01673=(1)(10,000)+(0)(1,000)+(7)(100)+(1)(10)+\\(4)(1)+(0)(0.1)+(1.673)(0.01)$$

This example determination may be used for each fault code in order to prioritize all of the fault codes (based on the highest priority number).

As such, referring back to FIG. 2, after each fault code is prioritized (204), the FCH analyzer 110 determines the first root cause (205). In certain embodiments, the first root cause is the fault code number having the highest priority rating ("number"). The FCH analyzer 110 may then remove this fault code number (first root cause) and its associated interaction fault codes from the original list of fault codes (206). As such, one or more unused fault codes remain. The FCH analyzer 110 may determine that the next highest priority fault code (from the fault codes remaining) is the second root cause (209) and determine its associated interaction fault codes (210). This process of identifying root cause fault numbers and associated interaction fault numbers may continue until all identified fault codes are accounted for as either a root cause, interaction fault code, or separate fault code. Finally, the likely root cause and interaction fault code numbers are provided to the user, technician, or mechanic. As such, the user may troubleshoot the root cause fault code number first. In some embodiments, troubleshooting the first root cause may clear the remaining fault codes. In turn, a mechanic, user, or technician may improve their efficiency by being directed to the likely root cause of the engine malfunction causing the fault code.

Referring next to FIG. 3, a flow chart 300 of the FCH analyzer 110 providing root cause information is shown, according to an example embodiment. Typically, method 300 is implemented in a network environment as shown in FIG. 6 or, in various other embodiments, as an application on the interface device 130 (FIG. 5). To initiate, the FCH analyzer 110 receives a plurality of fault codes (301). The fault codes are prioritized (302). Typically, the analyzer 110 generates priority numbers used to prioritize each of the fault codes. The priority number determination may be characterized by the same technique as used above (e.g., utilizing the seven categories, with various value assignments ("a" values) per category, and with various weighting ("w" values) applied to each of the categories). Based on the priority numbers, the FCH analyzer 110 determines a root cause fault code (303). The FCH analyzer 110 may also determine the interaction fault codes for that root cause fault code (304). If there are no unaccounted for codes (i.e., all the fault codes are determined to be either a root cause or an interaction fault code), then the FCH analyzer 110 provides the root cause and interaction fault code information to the user at 308.

If there are remaining unaccounted for fault codes, the FCH analyzer prioritizes the remaining fault codes (306) and determines another root cause fault code based on these remaining fault codes (307). Typically, the FCH analyzer 110 also determines the interaction fault codes for the next identified root cause. In some embodiments, steps 305-307 continue until all of the received fault codes are classified as either a root cause or an interaction fault code. According to various embodiments, one or more fault codes may be incapable of being classified as a root cause or an interaction fault code. For example, if two unrelated (not interactions of each other) fault codes remain that were not interactions of the other root cause(s), then the FCH analyzer may provide these fault codes as unrelated to the identified root cause(s) and interaction fault codes (step 308).

Figure 4A:
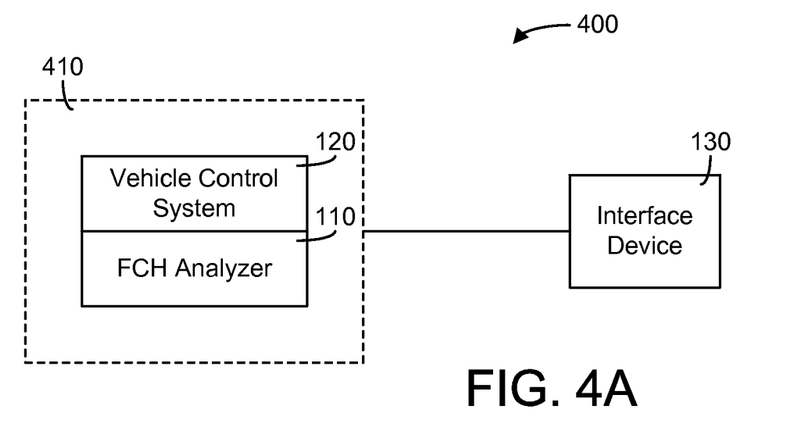
FIG. 4A is an implementation of a fault code hierarchical ("FCH") analyzer within a vehicle according to an exemplary embodiment.
Figure 4B:
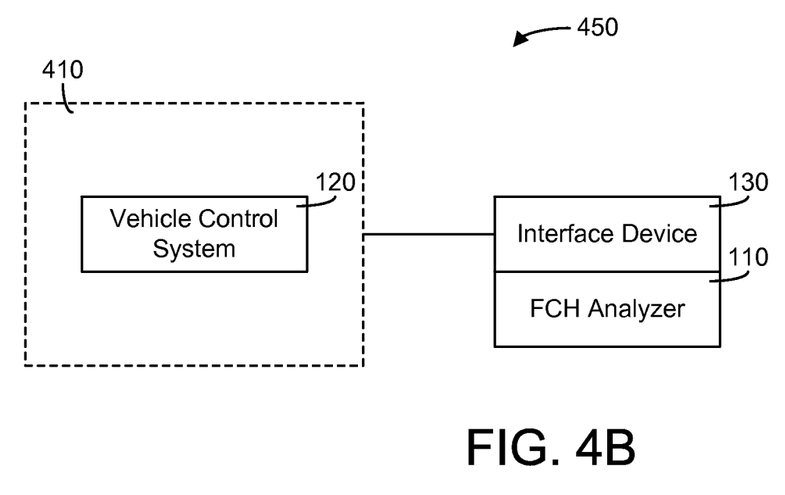
FIG. 4B is an implementation of a FCH analyzer external to a vehicle according to an exemplary embodiment.
Figure 5:
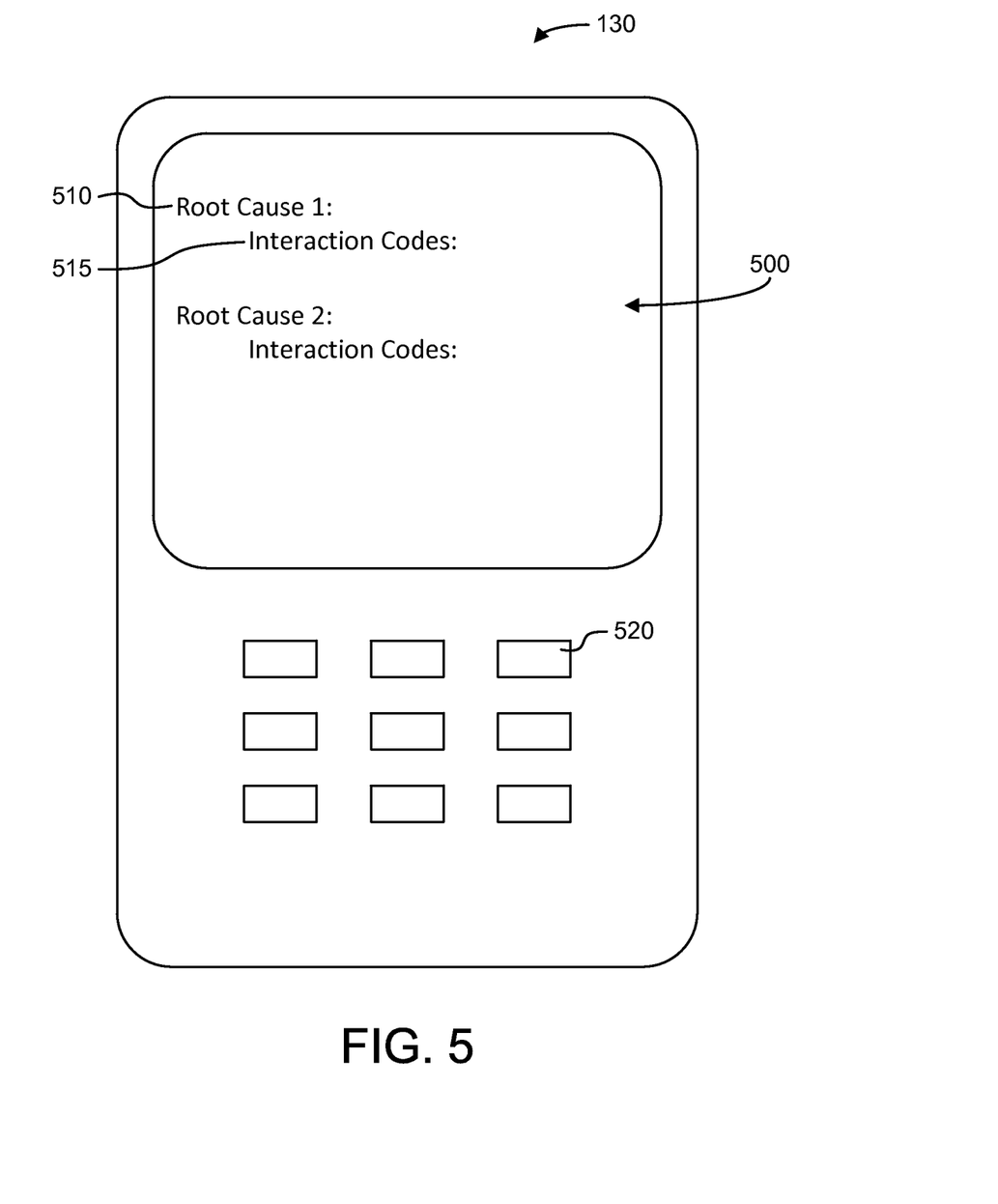
FIG. 5 is a front view of an interface device for a fault code hierarchical system according to an exemplary embodiment.
Figure 6:
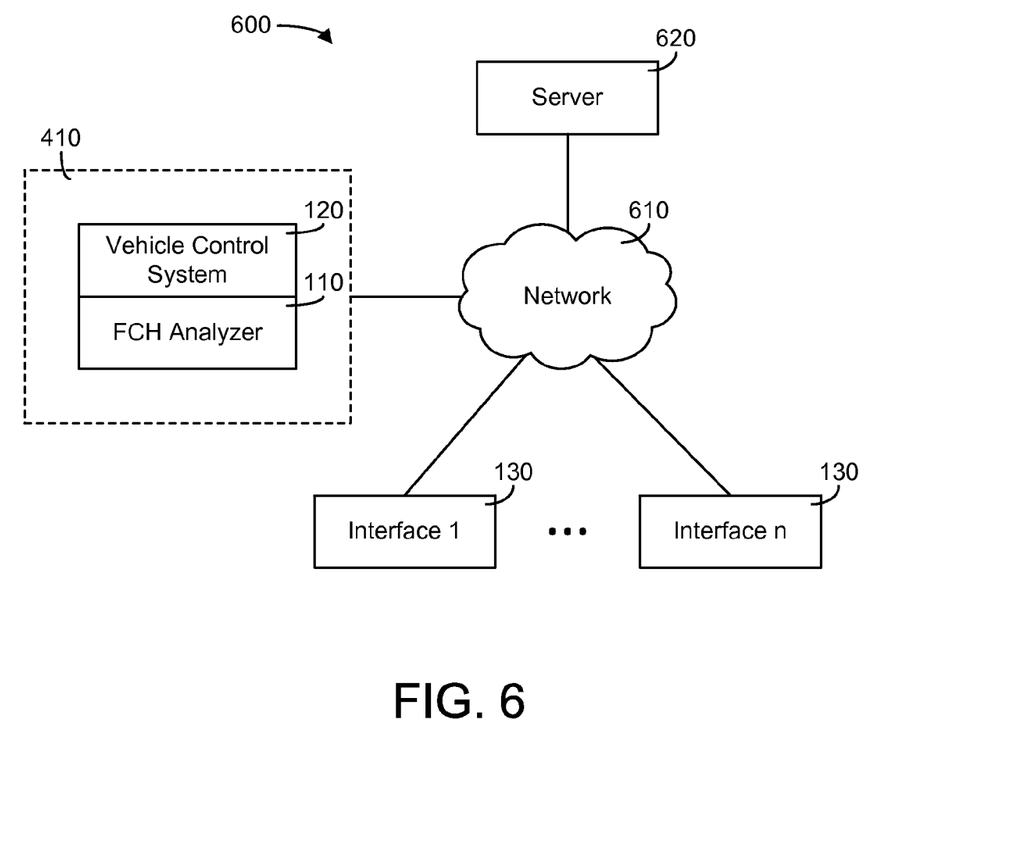
FIG. 6 is a network implementation of a fault code hierarchical system according to an exemplary embodiment.

Referring more particularly to FIGS. 4A-6, various implementations of the FCH analyzer 110 are shown according to example embodiments. Referring to FIG. 4A, in some embodiments, the FCH analyzer 110 may be implemented within the vehicle 410. In this configuration, the FCH analyzer 110 may be integrated within the vehicle control system 120 (e.g., as a module within the ECU) or otherwise integrated with the vehicle control system 120 (e.g., a separate module). In the example configuration of FIG. 4A, the interface device 130 may directly receive root cause and interaction fault code information from the FCH analyzer 110. Accordingly, in this configuration, the generated fault codes (active and inactive) may be stored by at least one of the FCH analyzer 110 (i.e., fault code memory device 111) or a vehicle control system 120 memory device (e.g., ECU). Active fault codes refer to fault codes that indicate a current fault condition. Inactive fault codes indicate a condition that has occurred since the last time fault data was cleared, but is not presently active. Typically, an interface device 130 does not receive inactive fault codes. By storing the generated fault codes (step 203 of method 200), the FCH analyzer 110 may account for both active and inactive fault codes. As such, the true root cause of the malfunction may be identified and properly addressed. Many times, a fault condition may not be active (i.e., not provided to a user via, e.g., the interface device 130) when a user retrieves diagnostic information about the vehicle. Therefore, vehicle and engine malfunctions may go unnoticed. According to the present disclosure, both the active and inactive fault codes are being used to generate priority numbers by the FCH analyzer 110. In some embodiments, after generation of the fault codes, the fault codes are stored for 25 engine-hours. Typically, the fault codes are stored for a time greater than 8 engine-hours in order to prevent misdiagnosis of the malfunction by the technician (i.e., the inactive fault codes are used in the priority number determination to discover the likely root cause).

Referring now to FIG. 4B, an FCH analyzer 110 is integrated with an interface device 130. According to one configuration, the FCH analyzer 110 may be another module within, for example, a diagnostic tool of a technician. Or, in another embodiment, the FCH analyzer 110 may be integrated into an application on a smartphone, computer, or tablet PC. In this configuration, the vehicle control system 120 generates fault codes each time a malfunction is detected. The FCH analyzer 110 receives the fault codes via the interface device 130. After reception, the FCH analyzer 110 performs steps 302-308 of method 300. In some embodiments, the interface device 130 also stores the received fault codes to account for active and inactive fault codes.

Referring next to FIG. 5, a display 500 of an interface device 130 is shown according to an example embodiment. Via display 500, the interface device 130 may provide root cause 510 and interaction fault code 515 information to a user, technician, or mechanic. The user may be able to adjust the weighting or categories used in the priority number determination button via control buttons 520. As an example embodiment of a display 500 (FIG. 5) for an interface device 130, FIG. 7 shows the priority determination (based on a priority number) for fault code number 1673 based on hierarchical categories above.

Referring to FIG. 6, a network 610 based implementation of the FCH analyzer 110 is shown according to an example embodiment. In some embodiments, system 600 includes server 620, network 610, and interface devices 130 (one through nth interface device 130). According to one embodiment, the FCH analyzer 110 may be implemented within server 620. As mentioned above, interface devices 130 may include a computer, tablet, smartphone, PDA, diagnostic tool, etc. Via interface device 130, a user may input the fault codes retrieved from their vehicle. The server 620, via FCH analyzer 110, may prioritize each inputted fault code and provide root cause and interaction fault codes (based on the aforementioned technique and method) to the user's interface device 130. Accordingly, the user of the interface device 130 may troubleshoot the appropriate fault codes (root causes) first to likely clear the other fault codes and fix the vehicle malfunction. As such, a relatively less amount of time is spent diagnosing the problem and a relatively greater amount of time is spent actually troubleshooting the problem. In some embodiments, as in FIG. 4A, the FCH analyzer 110 may be implemented within vehicle 410. Accordingly, the vehicle 410 may be connected to interface devices 130 via network 610. As such, the FCH analyzer 110 may categorize and prioritize the fault codes and provide that information directly via network 610 to interface devices 130.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The present disclosure contemplates methods, systems, and program products on any machine-readable media for accomplishing various operations. As mentioned above, in certain embodiments, the FCH analyzer forms a processing system or subsystem (of system 100) including one or more computing devices having memory, processing, and communication hardware. The analyzer may be a single device or a distributed device, and the functions of the analyzer may be performed by hardware and/or as computer instructions on a non-transient computer (or machine) readable storage medium. Such computer-readable media can be any available media that can be accessed by a general purpose or special purpose computer or other machine with a processor. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. In certain embodiments, the analyzer includes one or more modules structured to functionally execute the operations of the FCH analyzer. The description herein including the components of the FCH analyzer emphasizes the structural independence of the aspects of the analyzer, and illustrates one grouping of operations and responsibilities of the analyzer. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of the analyzer operations are included in the section referencing FIG. 1.

Example and non-limiting module implementation elements include sensors providing any value determined herein, sensors providing any value that is a precursor to a value determined herein, datalink and/or network hardware (i.e., transceiver 113) including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The term "server" includes all kinds of agent, devices, and machines for processing data, including by way of example a programmable processor, a computer, a system on a chip, or multiple ones, or combinations, of the foregoing. The agent can include special purpose logic circuitry, e.g., an FPGA (field programmable gate array) or an ASIC (application-specific integrated circuit). The agent can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The agent and execution environment can realize various different computing model infrastructures, such as web services, distributed computing and grid computing infrastructures. When information is transferred or provided over a network (e.g., FIG. 6) or another communications connection (either hardwired, wireless, or a combination of hardwired or wireless) to a machine, the machine properly views the connection as a computer (or machine) readable medium, like that described above. Thus, any such connection is properly termed a computer-readable medium.

What is claimed is:

1. A computer-implemented method of providing a root cause fault code for a vehicle comprising:
    connecting, by an interface device, to a diagnostic system of a vehicle;
    responsive to connecting, receiving, by a processor of the interface device, a plurality of fault codes corresponding to one or more conditions of the vehicle being outside of an acceptable operating range;
    prioritizing, by the processor of the interface device, each fault code within the plurality of fault codes;
    determining, by the processor of the interface device, a first root cause fault code corresponding to the highest prioritized fault code in the plurality of fault codes;
    determining, by the processor of the interface device, a first set of interaction fault codes, the first set of interaction fault codes relating to the first root cause fault code; and
    providing, by the processor of the interface device, the first root cause fault code and the first set of interaction fault codes to a display of the interface device;
    wherein the first set of interaction fault codes relate to the first root cause fault code based on a causal relationship, the causal relationship defined as the first root cause fault code either activating or deactivating each fault code within the first set of interaction fault codes.

2. The method of claim 1, wherein the one or more vehicle conditions include at least one of an engine operating condition, an aftertreatment operating condition, and an electrical system operating condition.

3. The method of claim 1, wherein the first set of interaction fault codes relate to the first root cause fault code based on each fault code within the first set of interaction fault codes corresponding to the same component or system of the vehicle as the first root cause fault code.

4. The method of claim 1, wherein the interface device includes at least one of a smartphone, a mobile computing device, a tablet computer, and a personal digital assistant.

5. The method of claim 1, wherein prioritizing each fault code is based on a relationship between each fault code and a set of hierarchical categories.

6. The method of claim 5, wherein the set of hierarchical categories include, in order of most heavily weighted to least heavily weighted, a voltage-related category, an engine control unit-related category, a fault code type category, a failure type category, a number of interactions category, a location category, and a fault code number itself category.

7. The method of claim 1, further comprising determining that one or more fault codes are unused based on not being included in either the first set of interaction fault codes or as the first root cause fault code.

8. The method of claim 7, further comprising prioritizing each unused fault code in the one or more unused fault codes.

9. The method of claim 8, further comprising determining a second root cause fault code corresponding with the highest prioritized unused fault code.

10. The method of claim 9, further comprising determining a second set of interaction fault codes for the second root cause fault code based on the one or more unused fault codes.

11. The method of claim 10, further comprising providing the second root cause fault code and the second set of interaction fault codes to the interface device.

12. A fault code analyzer for a vehicle comprising:
a fault code memory device configured to store a plurality of active and inactive fault codes for the vehicle; and
a priority processor coupled to the memory device and configured to:
receive the plurality of active and inactive fault codes responsive to connecting to a control system of the vehicle;
prioritize each fault code within the plurality of active and inactive fault codes;
determine a first root cause fault code, the first root cause fault code corresponding to the highest prioritized fault code;
determine a first set of interaction fault codes, the first set of interaction fault codes relating to the first root cause fault code; and
provide the first root cause and first set of interaction fault codes to a display of an interface device of a user;
wherein the first set of interaction fault codes relate to the first root cause fault code based on a causal relationship, the causal relationship defined as the first root cause fault code either activating or deactivating each fault code within the first set of interaction fault codes.

13. A fault code analyzer for a vehicle comprising:
a fault code memory device configured to store a plurality of active and inactive fault codes for the vehicle; and
a priority processor coupled to the memory device and configured to:
connect to a diagnostic system of the vehicle;
receive a first set of fault codes corresponding to one or more operating conditions of the vehicle from the diagnostic system;
prioritize each fault code within the first set of fault codes;
determine a first root cause fault code, the first root cause fault code corresponding to the highest prioritized fault code;
determine a first set of interaction fault codes, the first set of interaction fault codes relating to the first root cause fault code; and
provide the first root cause fault code and first set of interaction fault codes to a display of an interface device of a user;
wherein the first set of interaction fault codes relate to the first root cause fault code based on a causal relationship, the causal relationship defined as the first root cause fault code either activating or deactivating each fault code within the first set of interaction fault codes.

14. The analyzer of claim 13, wherein the processor is configured to determine that one or more fault codes are unused based on not being included in either the first set of interaction fault codes or as the first root cause fault code.

15. The analyzer of claim 14, wherein the processor is configured to prioritize each unused fault code within the one or more unused fault codes and determine a second root cause fault code corresponding with the highest prioritized unused fault code.

16. The analyzer of claim 15, wherein the processor is configured to determine a second set of interaction fault codes, the second set of interaction fault codes relating to the second root cause fault code.

17. The analyzer of claim 16, wherein the relationship, between the first set of interaction fault codes and the first root cause fault code and between the second set of interaction fault codes and the second root cause fault code, is based on each fault code within the first set of interaction fault codes corresponding to the same component or system of the vehicle as the first root cause fault code and each fault code within the second set of interaction fault codes corresponding to the same component or system of the vehicle as the second root cause fault code.

18. The analyzer of claim 16, wherein the relationship between the second set of interaction fault codes and the second root cause fault code is based on a causal relationship, the causal relationship defined as the second root cause fault code either activating or deactivating each fault code within the second set of interaction fault codes.

* * * * *